United States Patent [19]
Virk

[11] Patent Number: 5,967,434
[45] Date of Patent: Oct. 19, 1999

[54] APPARATUS FOR GRATING CHEESE AND THE LIKE

[76] Inventor: Shameer Singh Virk, 20 Sunset Rd., Wayland, Mass. 01778

[21] Appl. No.: 08/962,728

[22] Filed: Nov. 3, 1997

[51] Int. Cl.[6] .................................................. B02C 19/20
[52] U.S. Cl. ................................. 241/169.1; 241/273.2; 241/280; 241/281
[58] Field of Search ............................ 241/169.1, 273.2, 241/280, 281, 282, 168

[56] References Cited

U.S. PATENT DOCUMENTS

| | | | |
|---|---|---|---|
| D. 233,204 | 10/1974 | Fisher | 241/169.1 X |
| 435,235 | 8/1890 | Maxson | 241/169.1 |
| 659,822 | 10/1900 | Moore | 214/169.1 X |
| 762,497 | 6/1904 | Snyder | 241/169.1 X |
| 926,327 | 6/1909 | Hoffman | 241/168 X |
| 936,101 | 10/1909 | Edwards, Jr. | 241/169.1 |
| 3,552,460 | 1/1971 | Cooney | 241/169.1 |
| 3,581,790 | 6/1971 | Del Conte | 241/169.1 X |
| 3,642,045 | 2/1972 | Buvelot | 146/60 |
| 5,071,663 | 12/1991 | Dugan | 426/112 |
| 5,364,037 | 11/1994 | Bigelow | 241/93 |

Primary Examiner—John M. Husar

[57] ABSTRACT

An apparatus for grating or shredding cheese or like foodstuff, or for storing it in a ready-to-grate or -shred condition. A container is provided within which cheese, or like foodstuff, is mounted or stored on a spring-loaded plate, being captured at the container open end with a grating cap having raised blades on its internal surface in contact with the cheese or like foodstuff, which grate or shred the foodstuff when the grating cap is rotated versus the container, and having holes and perforations through its thickness from which the grated foodstuff exits. The cross section of the container cavity is non-circular and is defined by a multiplicity of contiguous container internal sidewalls, at least one of which is planar. The cross sections of the mounting plate and cheese, or like foodstuff, conform to the container cavity cross section, immobilizing the cheese, or like foodstuff, rotationally with respect to the container. The cheese, or like foodstuff, is grated or shredded when the grating cap is rotated relative to the container with sufficient force so as to overcome the foodstuff's shearing resistance. A sealing cap is provided optionally to seal-in the freshness of the cheese, or like foodstuff, when stored in the apparatus of the present invention.

21 Claims, 4 Drawing Sheets

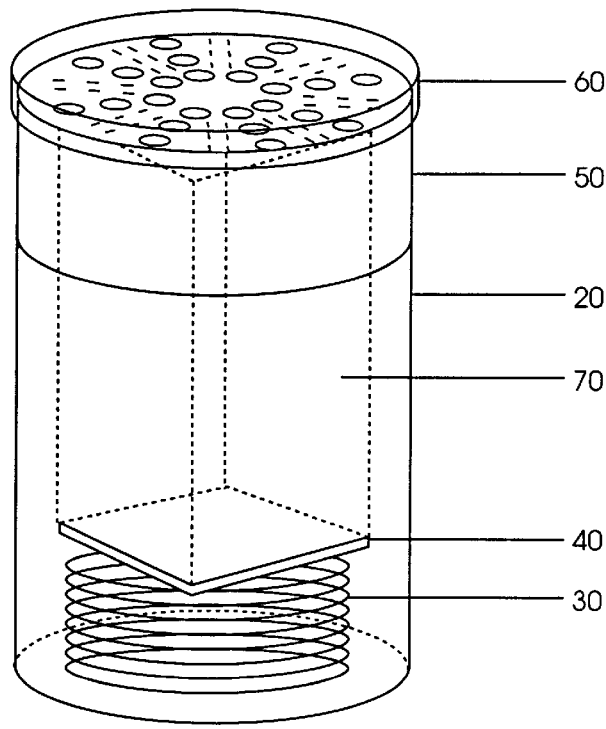
FIGURE 2
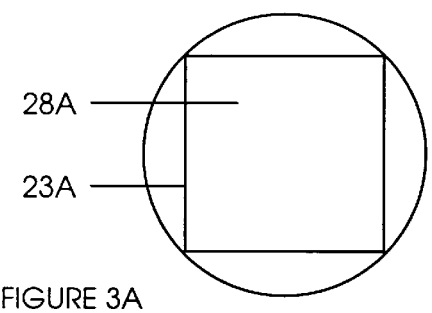
FIGURE 3A
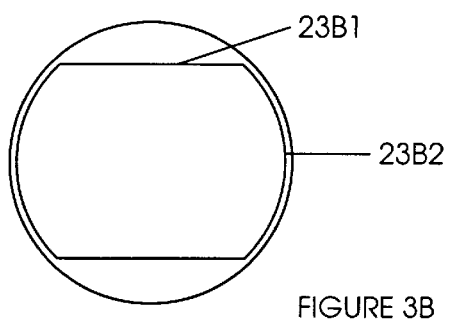
FIGURE 3B
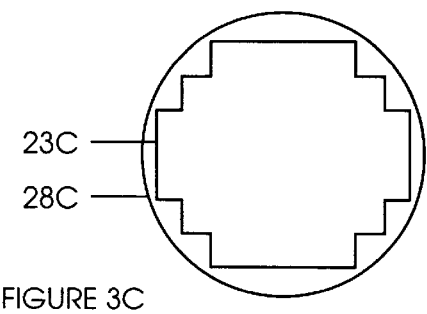
FIGURE 3C
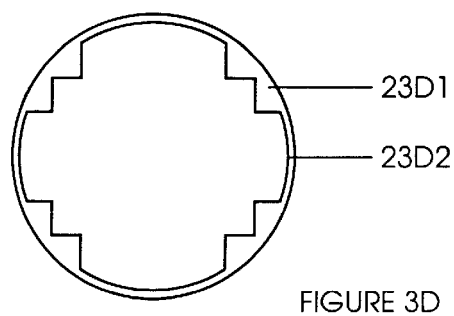
FIGURE 3D
FIGURE 3

5,967,434

APPARATUS FOR GRATING CHEESE AND THE LIKE

FIELD OF THE INVENTION

The present invention relates to hand held, manually operated units for grating or shredding cheese, or like foodstuff.

BACKGROUND OF THE INVENTION

Pre-grated or pre-shredded cheese is used as an essential ingredient in food preparation or added to cooked food as a complement to enhance taste. Cheese may be typically procured from the supermarket in block or grated form. The grated form of cheese, while convenient to use, contains chemicals and cellulose additives for increased shelf life and prevention of caking. Cheese shelf life and freshness diminish over time from exposure to ambient air and moisture. It is desirable to freshly grate cheese from a cheese block, which, because of its much smaller exposed surface area per unit volume of cheese compared to grated or shredded cheese in particulate form, retains its freshness for a much longer time.

Previous designs of cheese grating or shredding units for wide usage suffer from various limitations. They are typically expensive to make, require cheese in custom forms not readily available, hold small quantities of cheese, are inconvenient to use, and lack provisions for storing bulk cheese with extended shelf life for marketing of cheese packaged integrally with the grating or shredding units.

As examples, certain previous designs of grating or shredding units require the cheese to possess certain physical features, such as being split into two half-cylinders, as in U.S. Pat. No. 3,642,045, dated Feb. 15, 1972 issued to J. Buvelot, or having a hollow core at its center, as in U.S. Pat. No. 5,071,663, dated Dec. 10, 1991 issued to E. Dugan. These units generally require the block cheese to be of cylindrical geometry, which is modified to suit the grater being used. These designs are largely incompatible with the large amount of block cheese marketed by leading cheese manufacturers in the shape of rectangular parallelepipeds.

Some of the designs also require physical penetration of the cheese blocks by mechanical structures that restrain the cheese as it is grated. The force required to overcome the resistance of the cheese to being grated, when placed in contact with the grating screen and moved with respect to it, is overcome by applied forces that cause the cheese and the grating screen to move with respect to each other. These forces are typically applied manually, as in the above patents, or may be applied using an electric motor as in U.S. Pat. No. 5,364,037, dated November 15 issued to G. Bigelow. The cheese penetrating structures help transmit the externally applied forces to the cheese. These structures, however, cause wastage, since the cheese trapped in between the penetrating structures is not available to the grating screen. There is also a safety issue. The user may apply excessive force in grating the last remaining morsel of cheese and cause chipping of the penetrating elements leading to contamination of the food.

Further, as in the Buvelot patent, several of the previous cheese, or like foodstuff, grater designs require that when the cheese is grated, pressure be applied manually against the cheese to keep it in contact with the grating screen as the operator turns it relative to the cheese, causing the latter to grate. The manually applied pressure is inconvenient, variable, and non-uniform across the cheese block. This causes uneven grating and production of non-uniformly sized grated cheese particles, diminishing the aesthetics and causing variability in the flavoring of the food when cheese grating is performed directly over a food dish. Where a spring has been added to achieve application of uniform pressure on the cheese block, as in the Dugan patent, cheese rotation versus a grating screen has been achieved with an external handle mechanism increasing the complexity and cost of the unit.

SUMMARY OF INVENTION

Accordingly, an object of the present invention is an apparatus for grating or shredding cheese, or like foodstuff, that is inexpensive, disposable, easily transportable, and conveniently assembled.

Another object of the present invention is a grating or shredding apparatus designed for use with cheese blocks widely marketed by cheese manufacturers as rectangular parallelepipeds.

Yet another object of the present invention is a grating or shredding apparatus that applies constant and uniform pressure to the block of cheese, or like foodstuff, as it is grated or shredded.

A still another object of the present invention is to provide a means for storing cheese, or like foodstuff, inside the apparatus to keep it fresh when not being grated or shredded.

A further object of the present invention is to grate or shred cheese, or like foodstuff, without the use of penetrating mechanical structures.

A still further object of the present invention is to provide the end user with cheese, or like foodstuff, that is integrally packaged in the apparatus and ready for grating or shredding.

These objects of the present invention, among others, are accomplished in the invention as set forth in the description and claimed in this specification. The device is designed to provide freshly grated or shredded cheeses, conveniently, economically, and without any chemical additives or substitutes. It will be used to grate hard cheeses like Parmesan and Pravalons, as well as soft cheeses like Cheddar, American, and Swiss.

Besides providing an apparatus for grating or shredding cheese, the present invention will also make available to the end user one-half to one pound, or larger, blocks of ready-to-grate, or -shred, cheese, or like foodstuff, prepackaged within the disposable apparatus of the present invention. The end user can buy the packaged cheese, shred or grate as needed, and then discard or re-use the relatively inexpensive grating apparatus assembly. The apparatus of the present invention may be used either as a throwaway unit with prepackaged cheese or as a reusable device adapted to various cheese varieties on the market. Where cheese is prepackaged with the apparatus of the present invention, the cheese will have been preferably processed for extended shelf life by methods known in the industry, such as spraying the cheese with a roughly 1 micrometer thickness of bees wax and purging the atmosphere around the sealed and packaged cheese with dry nitrogen, or vacuum encapsulating the cheese in air- and moisture-proof metalized foil or plastic film products.

BRIEF DESCRIPTION OF THE DRAWINGS

The invention will be more fully understood from the detailed description that follows when taken in conjunction with the drawings presented herewith:

FIG. 2 is a view of the assembled apparatus showing the cheese, or like foodstuff, loaded into it and ready for grating or shredding;

FIG. 3 presents four container cavity cross sections representative of those covered by the present invention and in which the cheese, or like foodstuff, would be accommodated;

DETAILED DESCRIPTION OF THE INVENTION

Figure 1A:
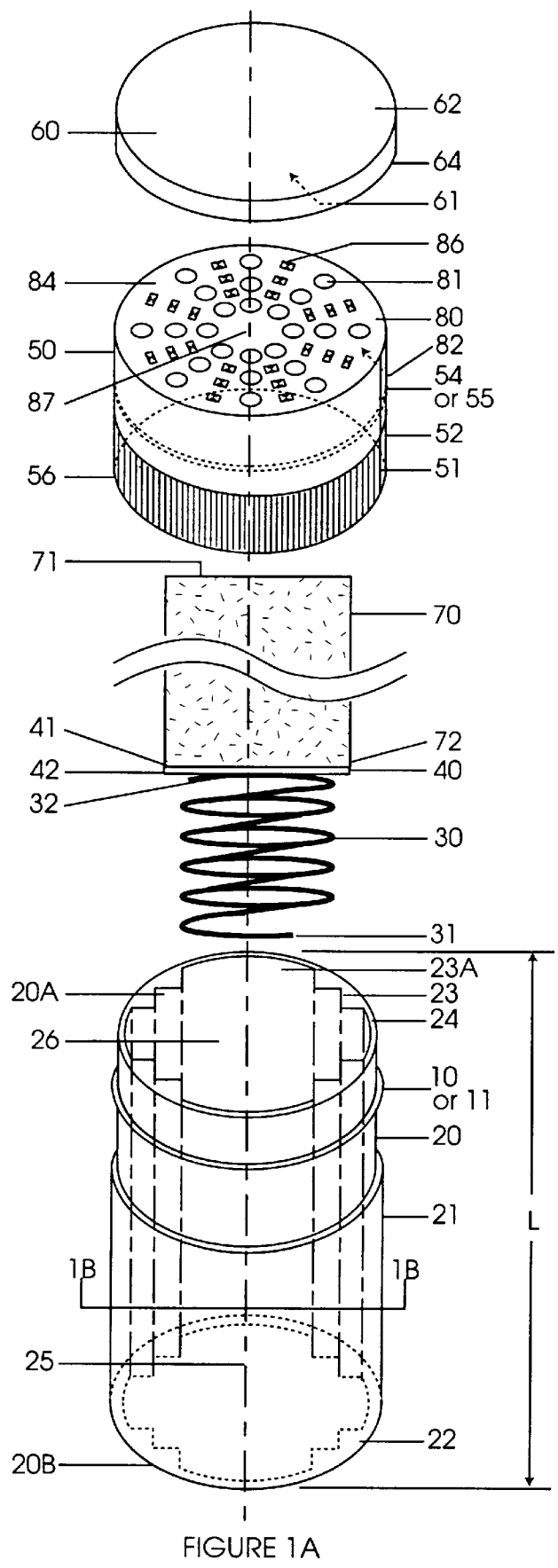
FIG. 1 is an exploded view of the main components of the apparatus comprising the present invention.

FIG. 1 presents the exploded view of the main parts of the present invention. The apparatus claimed generally comprises a container 20, a spring 30, a plate 40, a grating cap 50, and a sealing cap 60. The view of the assembled device showing cheese, or like foodstuff, 70, captured within the container in between the spring-loaded plate 40 and the grating cap 50 is shown in FIG. 2. The sealing cap 60 may be used optionally to seal in the freshness of the cheese or like foodstuff when it is being stored prior to use.

The container 20 is an internally hollow generally cylindrical structure comprising a sleeve 20a and a base 20b. The sleeve 20a is defined by an external surface 21 and a multiplicity of contiguous internal sidewall surfaces 23. These external and internal surfaces extend upwardly from the base 20b comprising the closed end 22 of the container, and terminate at an open end 24. The external and the internal surfaces, 21 and 23, are preferably disposed symmetrically about a common longitudinal axis 25. The base 20b and internal sidewall surfaces 23 define the length, L, and cross-section 28 of the container cavity 26. The present invention requires the cavity 26 to have a cross section 28 that is non-circular. This is most easily accomplished if one or more of the internal surfaces 23 is planar. The non-circular cross section requirement for the container cavity 26 arises from the need to rotationally immobilize the cheese or like foodstuff relative to the container cavity so that, as explained later, the cheese can be grated or shredded with a rotary action of the grating cap 50.

Four examples of the numerous cavity cross sections that can be achieved with internal sidewall surfaces having either planar or a combination of planar and cylindrically curved geometries are shown in FIG. 3. FIG. 3A shows a rectangular cross section 28a comprising the preferred embodiment of the invention, which is obtained using four planar internal sidewalls 23a. A rectangular cross section is compatible with much of the cheese marketed by cheese manufacturers in the form of rectangular parallelepipeds. FIG. 3B shows an alternate cross section, which is also compatible with cheese in the form of rectangular parallelepipeds, but is achieved through the use of two sets of sidewall surfaces, of which one set 23b1 is planar and the other set 23b2 is of cylindrically curved geometry. FIG. 3C shows a cross section 28c which comprises a multiplicity of rectangular cross sections obtained using a plurality of planar surfaces 23c, adaptable to a range of cheese rectangular parallelepiped cross sections. Similarly, as in FIG. 3D, a cross section comprising a multiplicity of such rectangular cross sections can be obtained with sets of planar 23d1 and cylindrically curved internal surfaces 23d2. A range of additional cross sections are possible using a combination of planar or non planar surfaces. They include a star, polygon, or a circle with a flat on one side, and are contemplated to be within the apparatus claimed as the present invention.

At near its open end 24, the external surface 21 of the container 20 is provided with means to couple with, and anchor to, the grating cap 50 while ensuring free rotation of the cap 50 relative to the container 20. Such means preferably include a full circle protrusion 10, or may, alternatively, include a full circle groove 11. In another embodiment of the invention, a series of similar discrete protrusions disposed circularly about the longitudinal axis 25 could be provided to achieve the same function as the full circle protrusion on the external surface 21. In yet another embodiment of the invention, the coupling means, including the protrusion or groove features, could be provided on the internal surface 23 of the container 20. Other means not elucidated in this specification, but which couple and anchor the container 20 to the grating cap 50, while maintaining full rotational freedom with respect to each other in the manner described above, are within the scope of the present invention.

Figure 4:
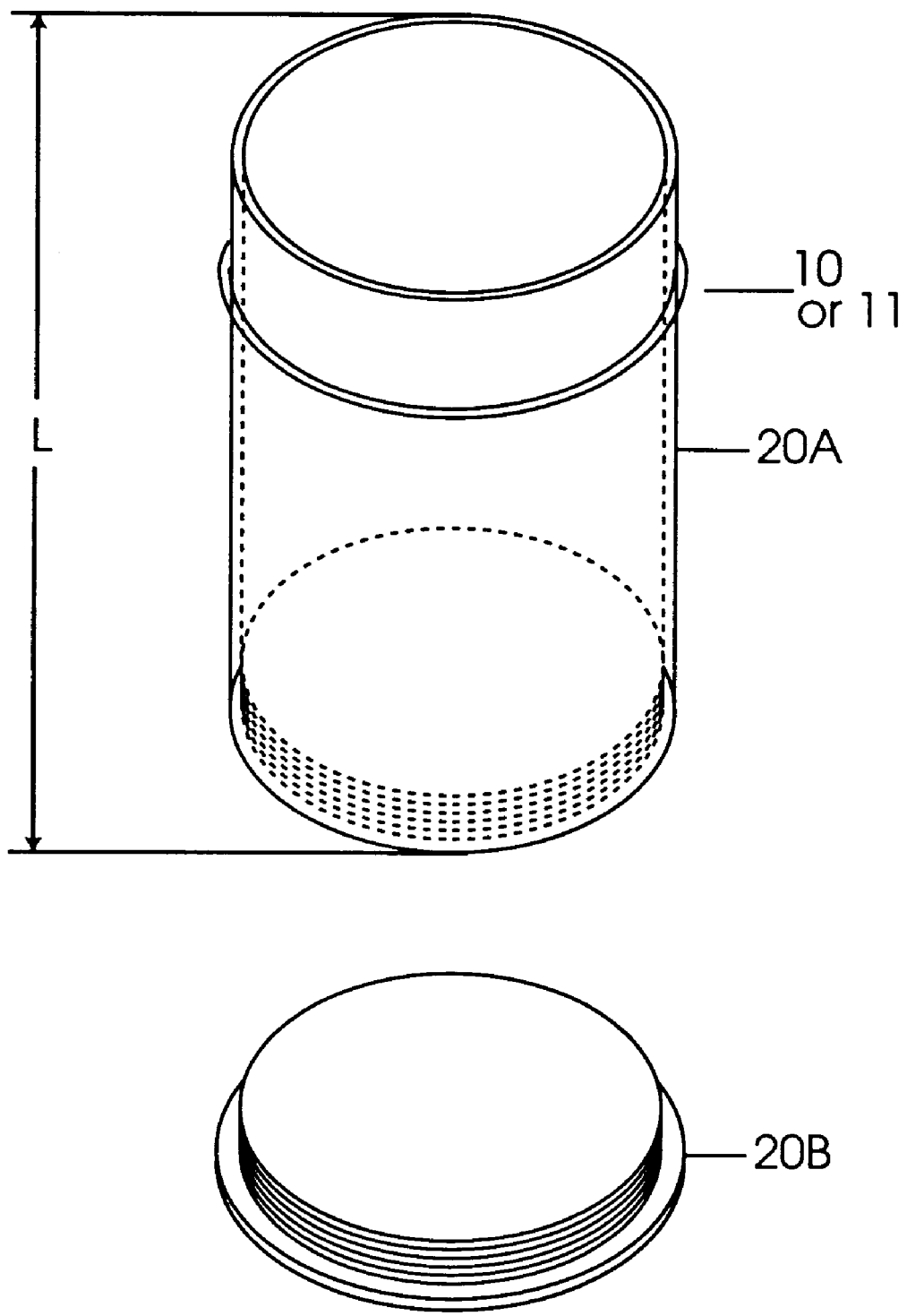
FIG. 4 shows the container of the apparatus as being assembled from two discrete pieces, a sleeve and a base, having mating male and female threads.

Containers in these geometries may be made in a variety of ways from metal or plastic. Metal can be extruded to provide the external and internal surfaces with the desired cross sections and the extruded metal cut to the required length to produce sleeve 20a. The base 20b can then be attached to one end of sleeve 20a, either through a metal joining process known in the art or by threadedly attaching it using mating male and female threads provided on the bottom end 22 of container sleeve 20a and the base 20b which attaches to it, as seen in FIG. 4. Coupling means 10 or 11 require mechanically forming the grooves 11 or protrusions 10 at near the top open end of the container by metal forming processes known in the art. In the preferred embodiment, the container 20 is constructed in one piece through the use of injection molded plastic using a mold of suitable design. Alternatively, the container could be produced as a machined part. The container 20 is preferably made of clear plastic so that the amount of cheese, or like foodstuff, in the packaged device will be visible to the user. The choice of plastic, however, will likely be limited by the constraints imposed by the forming and fabrication technologies.

Figure 5A:
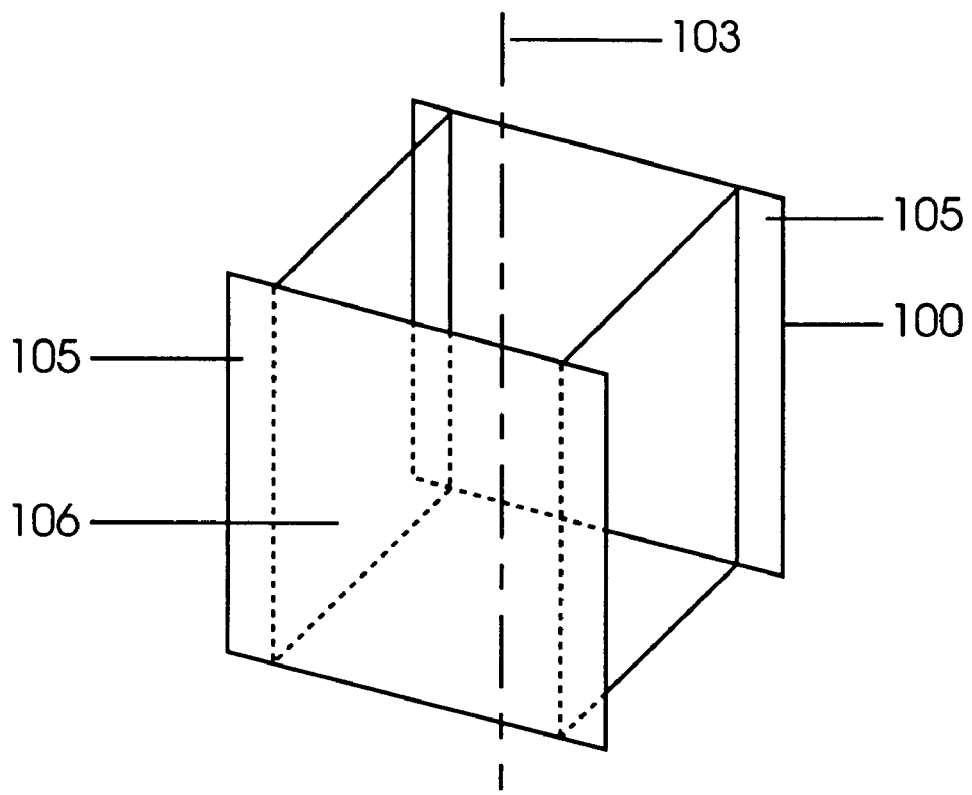
FIG. 5 shows an alternate design for the container in which a prefabricated insert is accommodated into the container to provide a cavity of the desired cross section.
Figure 5B:
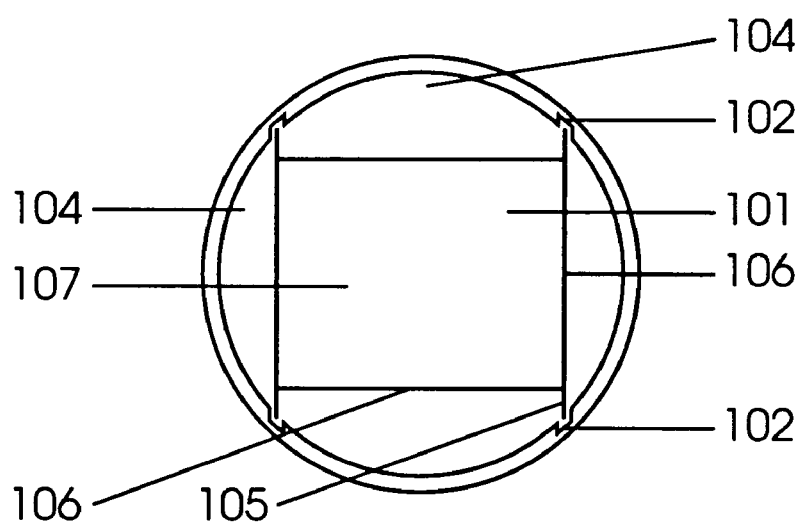

Providing the container with a non-circular internal cross section for rotationally immobilizing the cheese in the container, an objective of the present invention, can also be achieved in other ways. For example, in one embodiment, it is possible to achieve the required cross section by providing an insert 100 fabricated using multiple sets of parallel plates 106 as shown in FIG. 5, and having the required internal cross section 101. The insert 100 is then located into specific slots 102 oriented along the longitudinal axis 103, and formed on the container sleeve's internal surface 104, which, in this case, may be cylindrical. By constructing the insert as a rigid assembly and sliding the edges 105 of one or several of its plates of construction 106 into these slots, any rotation of the insert relative to the container is avoided. The inner surfaces 107 of the insert 100 then perform the same function as the internal sidewall surfaces 23 of the container 20 in FIG. 1.

The spring 30 can be of a helical design as shown in FIG. 1, or optionally could be in the form of a bellows as is known in the art. The range of the total achievable displacement of the bellows, however, is likely limited, in turn limiting the amount of cheese that can be grated. The spring 30 must project a cross sectional area that can fit into the cavity 26. In use, the lower terminal end 31 of spring 30 is seated at, or attached to, the base 20b comprising the bottom of cavity 26 of container 20. The spring 30 must be of a resilient material such as a metal or plastic, preferably one with a high tensile strength, with the property that it does not plastically deform upon being compressed, and upon removal of the applied load spontaneously relaxes back to its original unloaded length.

The length of the spring 30 in its relaxed state must be preferably greater than, and optionally roughly equal to, the length L of the container cavity 26. This way while the cheese is loaded for grating or shredding into the apparatus of the present invention, it remains in constant contact with the grating screen 80 of grating cap 50 as a result of the force that it experiences from the spring, whose terminal end 32 remains in contact with the bottom surface 42 of plate 40. The force, F, in Newtons, applied by the spring 30 to the cheese 70 is given by F=k.x where k is the spring constant, in Newtons/meter, and x the distance of travel, in meters, through which the spring is compressed from its unloaded state. As the spring relaxes with the grating of the foodstuff, this force decreases linearly with distance of travel of the plate 40. Since the minimum force required to accomplish grating or shredding depends on the nature of the foodstuff, different foods will preferably require different springs, selected either on the basis of their spring constants or their unloaded lengths.

Figure 1B:
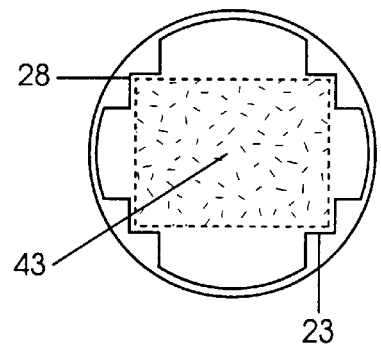

The plate 40 supporting the cheese, or like foodstuff, 70 has two flat and reasonably parallel surfaces: an upper surface 41 and a lower surface 42. The lower surface 42 is seated above spring 30, and is in constant contact with the spring's upper terminal end 32. The upper surface 41 of the plate 40 is available to mount cheese, or like foodstuff, for grating or shredding. The cross section 43 of the plate 40 is adaptable to the container cavity cross section such that rotational motion of the plate 40 relative to the container 20, about the longitudinal axis 25, is not permitted. It is desired that the plate 40 conform to the cavity cross section 28 sufficiently closely so that it has little to no rotational degree of freedom or appreciable rotational play about the longitudinal axis 25. This does not necessarily require that the plate cross section 43 match exactly, or even very closely, the cavity cross section 28, but that it match it sufficiently to accomplish the purposes of the present invention. An example of a plate cross section 43 meeting these requirements relative to the cavity cross section 28 is shown in FIG. 1B.

The requirement that the plate cross section 43 conform to the cavity cross section 28 is not critical to rotationally immobilizing the cheese, or like foodstuff, 70 relative to the container 20 for grating or shredding purposes, without the use of mechanical structures penetrating the foodstuff. That purpose is accomplished by having the cross section of the cheese, or like foodstuff, conform to that of the container cavity 26. However, having the plate cross section 43 conform to the cavity cross section 28 is useful in uniformly distributing the load from the compressed spring over the entire cross section of the foodstuff being grated or shredded.

In an alternative embodiment of the invention, the spring 30 and plate 40 assembly could be fabricated in metal or plastic as a single piece. In yet another embodiment of the invention, the base 20b of the container, the spring 30, and the plate 40 could all be provided as a single piece and the base could then be threadedly or otherwise attached to the container sleeve 20a. A threaded connection for such a single piece assembly, however, requires that the plate 40 cross section not conform closely to the cavity cross section 28, but be one that is freely rotatable within it.

The grating cap 50 has a generally cylindrical internal surface 51 and external surface 52 extending downwardly from a grating screen 80. The internal surface 51 is preferably provided with coupling and anchoring means which complement those of the container 20, as described previously, while allowing full rotational freedom of the grating cap 50 relative to the container 20. Such means on the grating cap 50 may include a full circle groove 54 or protrusion 55 designed to mate respectively with the protrusion 10 or groove 11 on the container external surface 21. In another embodiment of the invention, instead of one full-circle protrusion, several discrete protrusions may be provided on the internal surface 51. In yet another embodiment of the present invention, similar coupling means, including the groove or protrusion, or even discrete protrusions, may be provided on the external surface 52 of the cap for coupling respectively with suitable mating features provided on the internal surfaces 23 of the container 20. The external surface 52 of grating cap 50 is preferably provided with knurled features 56 for ease in gripping to facilitate manual operation of the apparatus of the present invention.

The grating screen 80 has a plurality of holes and perforations 81 extending through its thickness from an internal surface 82 to an external surface 84. The internal surface 82, additionally, has raised blades 86, as are commonly known in the art for grating or shredding of cheese, or like foodstuff, alongside, or in the vicinity of, the holes and perforations 81. The raised blades 86 grate or shred the cheese, or like foodstuff, when it is brought into contact with the blades 86 under load and while it is restrained from rotation within the container cavity 26 by the internal sidewall surfaces 23 forming the non-circular cross section 28, as the grating cap 50 is rotated relative to the foodstuff. The blades 86 dig into the cheese and generate the desired particulate product through multiple shearing actions. The grated or shredded cheese exits through the holes and perforations 81 provided in the screen 80.

The designs of the blades 86 and the holes and perforations 81 are tailored to the food that is intended to be grated or shredded. For instance, the harder cheeses require sharper blades than do the softer cheeses. The preferred pattern design of the blades 86 and holes and perforations 81 is one that provides uniform grating or shredding of the foodstuff across its entire surface. The grating or shredding action at the center of rotation, which is also the geometric center 87 of the screen 80, is achieved by providing blade and hole patterns that result in conical or helical grating or shredding of the foodstuff and permit its dispensing. As an example, screw-like blades located alongside the exit holes and perforations at or near the center of rotation of the grating cap shred the center portion of the cheese or like foodstuff into helical pieces.

The grating cap 50 may be made of metal or plastic. As with the container 20, the grating cap 50 could be produced either as a single piece by processes known in the art, such as metal working or injection molding of plastics, or may be produced in two parts: a generally cylindrical sleeve defined by internal surface 51 and external surface 52, and a grating screen 80. The two parts could be threadedly attached with mating male and female threads, or engaged by other means known in the art. The grating screen 80 can be produced in plastic or thin sheet metal by mechanically puncturing the sheet with a tool to form the holes and perforations, which also results in the formation of raised sharp blades on the tool exiting side of the sheet.

Briefly, in the preferred embodiment of the present invention, cheese, or like foodstuff, is loaded into container 20 on the upper surface 41 of plate 40 which is in contact with spring 30 located between the container base 20b and the lower surface 42 of plate 40. The block of cheese, or like foodstuff, is captured inside the container 22 with grating cap 50, which snaps on to a protrusion 10 or groove 11 on the container's external surface 21, even as the grating cap 50 remains freely rotatable relative to the container 20. The top surface 71 of the cheese, or like foodstuff, 70, thus spring-loaded, remains in constant contact with uniform force against the inner surface 82 of the grating or shredding screen 80. The plate 40 distributes the load from the compressed spring 30 uniformly upon the bottom surface 72 of the cheese, or like foodstuff, 70 helping its top surface 71 maintain intimate contact with the inner surface 82 of grating screen 80. The cross section of the cheese, or like foodstuff, is selected to be compatible with the cross section of the container cavity 28 so that there is no rotational freedom or slippage between the foodstuff 70 and the container internal sidewall surfaces 23 defining cavity cross section 28. Ideally, the cheese, or like foodstuff, cross section is just slightly undersized compared to the cavity cross section 28. In use, the assembled device is turned over and the grating screen 80 is made to point down, towards the food dish. The grating cap 50 is rotated relative to the container 20 so that cheese, or like foodstuff, 70 is grated or shredded by the raised blades 86 on the inner surface 82 of the grating screen 80 and rendered in small pieces as discrete particles that exit through the holes and perforations 81 in the grating screen 80.

While not essential to the operation of the grating unit, a sealing cap 60, comprising a cover, is provided in the preferred embodiment to accomplish the objective of keeping cheese, or like foodstuff, fresh, during storage inside the apparatus of the present invention. The sealing cap 60 has a generally cylindrical geometry, a closed end 62, and an open end 64. At the open end 64, the generally cylindrical internal surface 61 of sealing cap 60 slips over the generally cylindrical external surface 52 of the grating screen 80 end of the grating cap 50 and effects a seal, frictional or otherwise, between internal surface 61 of sealing cap 60 and the external surface 52 of grating cap 50. A secondary benefit of the sealing cap is that it protects any exposed cheese, or like foodstuff, from airborne contaminants, such as dust particles, that may find their way to the foodstuff 70 through the holes and perforations 81 in grating cap 50.

The present invention is not to be limited by what has been particularly shown or described, except as indicated by the claims herein presented.

I claim:

1. An apparatus for grating or shredding foodstuff, comprising:

a container having a generally cylindrical external surface and contiguous internal sidewall surfaces defining a sleeve, having at least one internal sidewall surface that is planar, the external and internal surfaces disposed about a longitudinal axis and extending upwardly from a base forming a closed bottom end, the sleeve and surfaces terminating in an open top end, the internal sidewall surfaces and base defining the length, cross section, and bottom end of the container cavity;

a spring adaptable to the cavity cross section and having upper and lower terminal ends, the lower terminal end seated on the base at the bottom end of the cavity, and in the relaxed state the upper terminal end extending roughly equal to, or beyond, the open top end of the container;

a plate adaptable to the cavity cross section and having a top surface and a bottom surface, the plate disposed within the cavity and capturing the upper terminal end of the spring with its bottom surface while making available its top surface to the foodstuff to be grated;

a hollow grating cap having a generally cylindrical wall extending downwardly from a closed top end forming a grating screen and terminating in an open bottom end, the grating screen having an inner surface with a center and an outer surface, the screen having a plurality of perforations and holes extending through it and a plurality of raised blades on the inner surface;

means for engaging and securing the grating cap open end to the container open top end while ensuring that the grating cap and container remain freely rotatable with respect to each other;

a hollow sealing cap forming a cover, having a generally cylindrical wall extending downwardly from a closed top end and terminating in an open bottom end, said sealing cap open end large enough to receive within it the grating cap closed end or container open top end, and effecting a frictional or otherwise seal between the sealing cap and the grating cap or the sealing cap and the container;

whereby foodstuff may be grated or shredded by placing it on the top surface of the plate, capturing the spring-loaded foodstuff within the container by pushing on it with the grating cap and securing said grating cap to the container, rotating said cap relative to the container causing the foodstuff to be grated by the raised blades, allowing the grated materials to exit through the perforations and holes provided, and sealing the assembly with the sealing cap to preserve the freshness of the foodstuff, when not being grated.

2. The apparatus in claim 1 wherein the container external surface is cylindrical and the container is a right circular cylinder.

3. The apparatus in claim 1 wherein the internal sidewall surfaces comprise a plurality of planar surfaces and the cavity cross section is polygonal.

4. The apparatus in claim 3 wherein the plurality of planar surfaces is four, and the cavity cross section is rectangular or square.

5. The apparatus in claim 3 wherein the plate shape is polygonal and is slightly undersized compared to the cavity cross section to permit easy assembly and disassembly.

6. The apparatus in claim 1 wherein the internal sidewall surfaces comprise a plurality of planar surfaces that define a cavity cross section capable of accommodating foodstuff in a range of rectangular or polygonal cross sections.

7. The apparatus in claim 1 wherein the container comprises a hollow sleeve threadedly or otherwise attached to the base.

8. The apparatus in claim 1 wherein the container further comprises a base and a sleeve, the sleeve having a plurality of slots running along the length of its internal surfaces, an insert having inner and outer surfaces fabricated from sets of plates having exposed edges captured by said slots, and said insert inner surfaces defining the cavity cross section.

9. The apparatus in claim 1 wherein the container body consists of metal or plastic.

10. The apparatus in claim 1 wherein the spring is made of a resilient material, such as high tensile strength steel or plastic, that remains fully elastically compliant during compression and relaxation.

11. The apparatus in claim 10 wherein the spring comprises a bellow.

12. The apparatus in claim 1 wherein the grating cap is made of metal or plastic.

13. The apparatus in claim 1 wherein the grating cap further comprises two separate pieces, a cylindrical sleeve, defined by grating cap inner and outer surfaces, and a grating screen, the grating screen threadedly or otherwise engaged with said grating cap cylindrical sleeve.

14. The apparatus in claim 1 wherein the grating screen is made from plastic or thin sheet metal, and the sheet is mechanically punctured to form the perforations with a tool which results in raised sharp blades on the tool exiting side of the sheet.

15. The apparatus of claim 1 wherein the center of the inner surface of the grating screen is provided with a raised blade and perforation and hole pattern designed to achieve conical or helical grating or shredding of the foodstuff, when brought into contact with the grating screen.

16. The apparatus of claim 1 wherein the grating cap has a cylindrical wall extending downwardly from the closed top end forming the grating screen.

17. The apparatus in claim 1 wherein the grating cap has an outer surface that has mechanically formed knurled or flat features.

18. The apparatus in claim 1 wherein means for engaging and securing grating cap to the container further comprise having a circularly disposed protrusion or full-circle indentation on the container external surface at near the open end of the container; having a mating circularly disposed full-circle groove or protrusion on the grating cap internal surface;

and engaging the grating cap groove or protrusion with the corresponding mating protrusion or groove on the container, while ensuring that the grating cap remains freely rotatable with respect to the container.

19. The apparatus in claim 18 wherein the container or grating cap protrusion comprises a full circle continuous ring protrusion or a multiplicity of protruded features.

20. The apparatus of claim 1 wherein the sealing cap has a cylindrical wall extending downwardly from the closed top end.

21. A grating or shredding device with prepackaged foodstuff comprising:

a container having a generally cylindrical external surface and contiguous internal sidewall surfaces defining a sleeve, having at least one internal sidewall surface that is planar, the external and internal surfaces disposed about a longitudinal axis and extending upwardly from a base forming a closed bottom end, the sleeve and surfaces terminating in an open top end, the internal sidewall surfaces and base defining the length, cross section, and bottom end of the container cavity;

a spring adaptable to the cavity cross section and having upper and lower terminal ends, the lower terminal end seated on the base at the bottom end of the cavity;

a plate adaptable to the cavity cross section having a top surface and a bottom surface, said plate disposed within the cavity and capturing the upper terminal end of the spring with its bottom surface;

adaptable to the the cavity cross section of the block of foodstuff on the plate top surface;

a hollow grating cap having walls extending downwardly from a closed top end forming a grating screen and terminating in an open end, the grating screen having an inner surface and an outer surface, the screen having a plurality of perforations and holes extending through it and a plurality of raised blades on the inner surface, the cap open end secured to the open top end of the container, while ensuring that the grating cap and container remain freely rotatable with respect to each other; and a hollow sealing cap forming a cover, having a generally cylindrical wall extending downwardly from a closed top end and terminating in an open bottom end, said sealing cap effecting a frictional or otherwise seal between the sealing cap and the grating cap or the sealing cap and the container.

* * * * *